United States Patent

[11] 3,587,032

| [72] | Inventor | Richard W. Normann |
| | | Otego, N.Y. |
| [21] | Appl. No. | 753,565 |
| [22] | Filed | Aug. 19, 1968 |
| [45] | Patented | June 22, 1971 |
| [73] | Assignee | The Bendix Corporation |

[54] SEPARABLE CONNECTOR WITH LOCKING MEANS
18 Claims, 5 Drawing Figs.

[52] U.S. Cl........................................................ 339/89,
285/86, 285/316
[51] Int. Cl........................................................ H01r 13/54
[50] Field of Search........................................... 339/89,
91, 186; 285/82,
84—86 X, 91, 316 X

[56] References Cited
UNITED STATES PATENTS
3,008,116  11/1961  Blanchenot................ 339/90

3,040,287  6/1962  Agron et al.................. 339/94
3,343,852  9/1967  Blight et al.................. 285/82

Primary Examiner—Ernest R. Purser
Assistant Examiner—Joseph H. McGlynn
Attorneys—Dale A. Bauer, John L. Seymour, Bauer and Seymour and Plante, Arens, Hartz and O'Brien ABSTRACT: A separable connector having two parts selectively held together in aligned operative position by a connecting sleeve rotatably mounted upon one of the bodies and held against axial movement with respect thereto in at least the direction toward the other body. The connecting sleeve and the other body have mating formations whereby the two parts of the connector are secured together upon the rotation of the sleeve in one direction relative to the other body. The present invention provides a selectively operable locking means whereby the connecting sleeve may be secured from rotation with respect to said other part whereby to prevent fortuitous separation of the two connector parts.

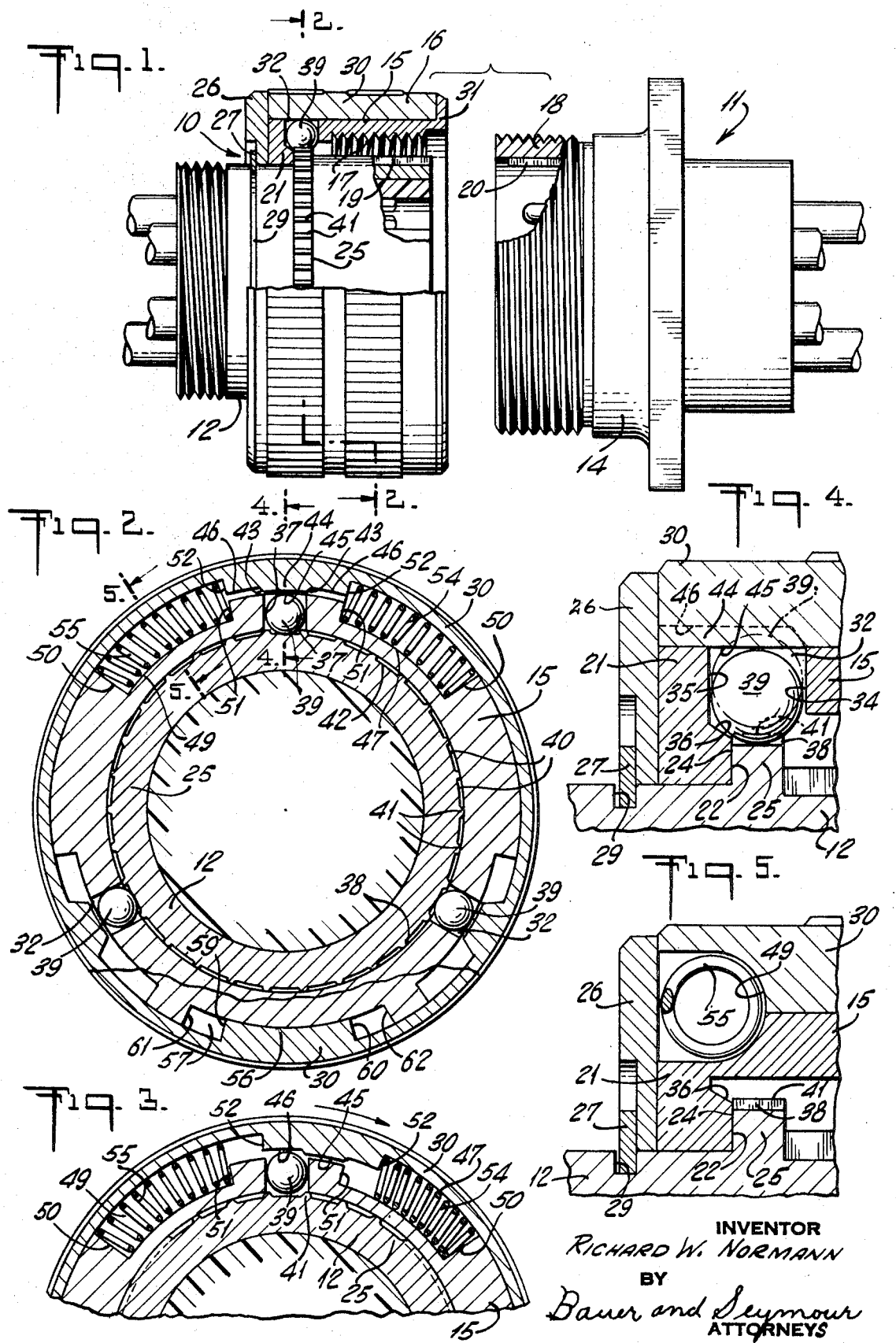

SEPARABLE CONNECTOR WITH LOCKING MEANS

This invention relates to a separable connector and more particularly relates to a separable connector of the type wherein the connector parts or bodies are selectively secured together by a connecting sleeve rotatably mounted upon one of the bodies and tethered thereto against axial movement toward the other body of the connector. The connecting sleeve and the other body of the connector are provided with interfitting formations such as threads, or pins and helical slots, whereby the turning of the connecting sleeve in an appropriate direction relative to the other body of the connector draws the two connector bodies together and secures them in operative position relative to each other. Specifically, the invention relates to locking means whereby the connecting sleeve is prevented from becoming accidentally loosened as a result of vibrations to which it may be subjected during use.

In the embodiment shown there is employed a second sleeve surrounding the first, connecting sleeve, there being a lost motion connection between the two sleeves. The locking means comprises at least one radially displaceable detent carried by the first sleeve and interacting with formations on the confronting walls of the first body and the second sleeve. When the second sleeve lies in a central position with respect to the first sleeve, the first sleeve is locked against rotation with respect to the first body. When, however, the second sleeve is displaced in either direction from such central position the detent is free to move radially from locking relationship with respect to the first sleeve and the first body, and the first sleeve may then be turned through the medium of the second, outer sleeve.

The invention has among its objects the provision of a selectively operated locking means for the rotatable connecting sleeve of a two-part connector.

A further object of the invention lies on the provision, in a connector of the type indicated, of a locking means for the connecting sleeve which adds little, if any, to the size and weight of the connector as compared to prior, unlocked connectors.

Another object of the invention resides in the provision of a locking means for the connecting sleeve wherein the locking means is normally in its operative position except when the operating means therefor is deliberately displaced from such normal position in which it is stably held.

Yet another object of the invention in the provision, in a connector of the type indicated, of an operating means for the locking means which is also employed, after it has been displaced from its normal, sleeve-locking position, to operate the connecting sleeve either to tighten the connector parts together or to loosen them, as desired, depending upon the direction of rotation of such operating means.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a view partially in side elevation and partially in radial section through the two bodies or parts of a two-part separable connector one part of which is provided with the locking means of the invention, the two parts of the connector being shown aligned and about to be advanced toward each other into connected, operative relationship;

FIG. 2 is a view in transverse section through a first part of the connector, shown at the left in FIG. 1, which bears the locking means, the section being taken along the line 2–2 of FIG. 1, the parts being shown with the locking means in operative position;

FIG. 3 is a fragmentary view in transverse section taken similarly to FIG. 2 but with the locking means in unlocked position and with the connecting sleeve about to be unscrewed from the other body of the connector;

FIG. 4 is a fragmentary view in radial axial section through the first part of the connector, such section being taken along the line 4–4 of FIG. 2; and FIG. 5 is a fragmentary view in radial axial section through the first part of the connector, such section being taken along the line 5–5 of FIG. 2.

In FIG. 1 there is shown a two-part connector with which the locking means of the present invention may be employed to advantage. The connector shown is an electrical connector, one part or body 10 of which has a shell 12 having a plurality of electrical contacts such as sockets carried by an electrically insulating insert therein, the other part or body 11 of the connector having a shell 14 containing another electrically insulating insert having a number of electrical contacts such as prongs similarly distributed over its area. The two connector parts 10 and 11 are connected by being disposed in alignment and advanced toward each other so that the prongs on the one part enter the sockets on the other. The bodies are further guided with respect to each other by interfitting longitudinal formations such as a longitudinally extending rib 20 on the shell of the connector part 11 and a longitudinal groove 19 in the shell 12 of the connector body 10 matingly receiving the rib. The connector bodies are drawn toward each other into their fully assembled operative position by means of a nut 15 internally threaded at 17 which is rotatably tethered on the shell 12 of connector part 10, such nut receiving and threadedly engaging an externally threaded hood portion 18 of the shell 14 of connector body 11. In the fully assembled condition of the connector, the hood portion of shell 14 is telescoped within the sleevelike portion 16 of nut 15.

It is to be understood that although the locking means is illustrated herein in connection with a two-part electrical connector, it may e used to advantage with other separable connectors wherein the two bodies are held together by a rotatable sleeve provided with threads engaging threads on the other connector body. Further, the mating formations on the connecting sleeve and the other body need not be threads but may be, for example, interfitting pins and helical grooves on the sleeve and other body, respectively, whereby the turning of the connecting sleeve in one direction pulls the two bodies of the connector into telescoping relation and maintains them in such relationship, and turning of the sleeve in the other direction releases the parts of the connector.

The end of the connecting sleeve or nut 15 rearwardly of the generally circular cylindrical portion 16 is provided with a radially inwardly extending flange 21 having a forwardly facing radially extending annular surface 22 which engages annular rear surface 24 of a radially outwardly extending flange 25 on the shell 12 of the connector body 10. Such engagement between the flanges 21 and 25 secures the nut 15 from travel axially of the shell 12 toward connector part 11 when the two connector parts 10 and 11 are tightened toward each other. Travel of the nut 15 in the other direction relative to the shell 12 is prevented by an annular retaining member 26 which is telescoped over the rear circular cylindrical portion of the shell 12 of the connector body 10, the member 26 being retained in substantial contact with the flange 21 by means of a spring ring 27 which is snapped into an annular groove 29 on the portion of the shell 12 rearwardly of the member 26. Because the nut 15 is thus held against substantial axial travel with respect to the shell 12, and because such nut has threaded engagement with the shell 14 of the connector body 11 as above explained, the turning of the nut in a connector body-loosening direction serves to jack the two connector bodies 10 and 11 apart so long as the threads 17 and 18 remain in effective threaded engagement.

The nut or connecting member 15 may be said to be generally in the form of a first sleeve which is telescoped about the shell 12 of the connector part 10. Telescoped about the nut 15 is a further or second sleeve 30 which functions both as a part of the means for selectively locking the connecting member 15 from rotation with respect to connector part 10 and for driving the nut in either the connector body-connecting or disconnecting direction. Sleeve 30 is retained against rearward travel with respect to shell 12 of connector part 10 by engagement with the radially outer portion of the annular member 26, and against forward travel with respect to shell 12 by engagement with a radially outwardly directed annular flange 31 on the forward end of the connecting member 15.

The connecting member 15 is provided with at least one radial slot 32 therethrough; in the illustrative embodiment, as shown in FIG. 2, there are three such slots, equally spaced about the connecting member 15. Each shot 32 has a flat forward wall 34, shown at the right in FIG. 4, which lies in a transverse plane normal to the axis of the member 15, and a rear wall which has radially outer flat portion 35 parallel to the forward wall 34. The radially intermediate portion 36 of the rear wall is in the form of a portion of a frustum of a cone coaxial of the nut 15 and converging forwardly. As shown in FIG. 2, the other walls 37 of the slot 32, which are disposed in planes at right angles to those of the walls 34 and 35 and parallel to the axis of nut 15, are straight, and lie parallel to each other at equal distances on either side of a central radial plane containing the axis of nut 15.

Disposed in each of the slots 32, as shown in FIG. 2, is a ball 39 having a diameter such that it fits fairly accurately, but with some play, between the opposite walls 34 and 35 on the one hand and the opposite walls 37 on the other. The peripheral outer surface of the flange 25 on the shell 12 is provided with a plurality of similar, similarly angularly spaced recesses 40 which are formed between successive axially extending lands 41, the bottoms 42 of the recesses 40 lying along a circle. The peripheral ends 38 of the lands 41 are inclined as shown, so that the balls 39 when released may readily roll up out of the recesses. The second or operating sleeve 30 is provided at the location of each of the slots 32, when the parts are disposed as in FIG. 2, with a radially inwardly and axially extending land 44 having a peripheral length which, in the embodiment shown, slightly exceeds the peripheral distance between the opposite sidewalls 37 of the slot 32. The free end, that is, the radially inner surface 45 of the land 44, which is curved concentrically to the bottom 42 of recesses 40, is spaced from such bottoms 42 of the recesses 40 by a distance which slightly exceeds the diameter of the ball 39.

It will be seen that with the parts in the position shown in FIG. 2, the balls 39 are prevented by the lands 44 from escape from the recesses 40, and that when the balls are in the recesses they lock the nut or connecting member 15 from rotation with respect to the shell 12 of the connector part 10. When, however, the balls 39 are permitted to move radially outwardly sufficiently to ride up over the lands 41 on flange 25 the nut 15 is unlocked from the shell 12 and is free to be turned in either direction with respect to the shell 12.

To permit the balls 39 to move radially outwardly to free the nut 15 for rotation, there is provided on each side of the land 44 on the inner surface of the sleeve 30 a recess 46 which is connected to the land by inclined ramplike surfaces 43. Each recess 46 has a curved root surface 53 which is coaxial of nut 15 and which lies radially outwardly of surface 45 of land 44 a distance which is at least equal to the radial depth of recesses 40. When the operating ring 30 is turned in either direction relative to nut 15 in an amount sufficient to bring the recesses 46 in radial alignment with each of balls 39, the balls climb up the walls 38 of the lands 41 on flange 25 and into recesses 46. The nut 15 is now free to be turned further with respect to shell 12 of connector part 10 in the direction in which it was initially turned to unlock the nut.

Beyond the peripherally outer end of each recess 46 and disposed partially in the connecting member or nut 15 and partially in the operating sleeve 30 there is a spring recess, of which one at each locking means is designated 47 and the other 49. Recesses 47, 49 are open at the axially rear ends of nut 15 and operating member 30, the springs being retained in the recesses by member 26 which overlies the rear ends of such recesses. Each of the recesses 47, 49 is closed at its peripherally outer end by a shoulder 50 which is formed wholly in the connecting member 15, as shown in FIG. 2. The peripherally inner end of each of recesses 47, 49 is formed partly by a shoulder 51 on nut 15 and partly by a shoulder 52 on operating sleeve 30. Shoulders 51 and 52 are in radial alignment when the parts are positioned as in FIG. 2. Disposed in each of the recesses 47, 49 is a coil compression spring 54 and 55, respectively. Each of such springs engages at all times at its outer end its respective shoulder 50 in the member 15. When the parts are in the locked position of FIG. 2, the inner ends of the springs engage both of shoulders 51 and 52 on the parts 15 and 30 at the inner end of the recesses 47, 49. When, however, the member 30 is turned in the connector loosening direction (FIG. 3), the spring 54 in recess 47 is compressed between the shoulders 50 and 52 of recess 47 so that the member 30, driving through the spring 54, tends to turn the connecting member 15 in its connector-loosening direction. If the member 30 were turned in the opposite direction in order to tighten the member 15, the initial driving between members 30 and 15 would be through the spring 55 acting between the shoulders 50 and 52 of recess 49.

As above explained, upon the turning of the sleeve 30 relative to the connecting member 15 in either direction from its central, locked position shown in FIG. 2 the balls 39 are freed from the recesses 40 in the flange 25 so that they may move radially outwardly to permit rotation of the member 15 relative to the shell 12. At any time, however, when the sleeve 30 is released, the springs 50 and 51, which are of equal compressive strength, return the member 30 to its central position (FIG. 2) wherein the lands 44 overlie the slots 32 in member 15. Thus the recesses 42, the balls 39, and the lands 44, taken with the springs 50 and 51, function to lock member 15 from rotation at any of its intermediate positions as well as its terminal on shell 14.

In order to prevent the undue compaction of the springs 54 and 55, and to provide a positive drive between sleeve 30 and the connecting member 15 after a predetermined lost motion therebetween, the sleeve 30 and the connecting member 15 are provided with the interfitting stop means known in FIG. 2. Such stop means are located somewhat axially forwardly of the locking means on the connector part 10, as shown by the broken sectioning line 2–2 in FIG. 1. Such stop means, which is shown in FIG. 2, comprises a radially inwardly projecting lug 56 on operating member 30, such lug being received within an elongated recess 57 in the outer surface of the connecting member 15. Lug 56 has opposite ends or shoulders 59, 60 which when the sleeve 30 is disposed centrally with respect to the connecting member 15 are generally equally spaced from their respective confronting shoulders 61, 62 forming the peripheral ends of the recess 57. It will be apparent that when the sleeve 30 is turned relative to the connecting member 15 and after the respective spring 54, 55 has been axially compressed to a predetermined degree the shoulders 59, 61 will engage if the sleeve 30 is turned in one direction and the shoulders 60, 62 will engage if the sleeve is turned in the other direction relative to the connecting member 15. There is thereupon formed a direct driving engagement between the sleeve 30 and the connecting member 15. Ordinarily, after the initial loosening of the connecting member 15, or prior to the final tightening of the connecting member, when the greatest torques between members 30 and 15 are required, the drive between operating member 30 and the connecting member 15 will be through the respective spring 54, 55.

Although only one embodiment of the invention has been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art.

I claim:

1. A separable connector comprising first and second connector bodies adapted to be secured together in aligned operative relationship, means for securing said bodies together comprising a sleeve mounted on the first body for rotation with respect thereto while being held from axial movement therealong toward the second body, interfitting formations on the sleeve and the second body which pull the connector bodies together and maintain them in that position upon the turning of the sleeve in one direction relative to the second body, and releasable locking means for positively preventing the turning of the sleeve from the position thereof relative to the second body in which it secures the connector bodies together in operative relationship, said locking means comprising a detent mounted for radial movement on said sleeve, said detent being operatively engageable with a recess in the outer wall of said first body in position to lock the latter and said sleeve against relative rotation, and a locking ring mounted on said sleeve for a limited range of angular movement relative thereto, said ring being adapted in one angular position to hold said detent in its locking position and being adapted in another angular position to release said detent from its locking position.

2. A separable connector as defined in claim 1 comprising resilient means for urging said locking ring to said one angular position on said sleeve for holding said detent in its locking position and for resisting angular movement of said locking ring from said one angular position for releasing said detent from its locking position.

3. A separable connector as defined in claim 1 comprising cooperable means on said sleeve and ring for limiting angular movement of the ring relative to the sleeve, and means on said ring operable when the ring is in said one angular position to hold said detent immovable in its locking position and operable to release said detent from its locking when the ring is in another angular position on the sleeve.

4. A separable connector comprising first and second connector bodies adapted to be secured together in aligned operative relationship, means for securing said bodies together comprising a first sleeve mounted on the first body for rotation with respect thereto while being held from axial movement therealong toward the second body, interfitting formations on the first sleeve and the second body which pull the connector bodies together and maintain them in that position upon the turning of said first sleeve in one direction relative to the second body, and releasable locking means for positively preventing the turning of said first sleeve from the position thereof relative to the second body in which it secures the connector bodies together in operative relation, said locking means comprising a second sleeve rotatably mounted upon the first body, rotary lost motion means connecting the two sleeves whereby the first sleeve may be turned by the second sleeve, normally operative detent means coacting with the first body and said sleeves for locking the first sleeve against rotation with respect to the first body, and means for rendering said detent means inoperative upon the turning of the second sleeve relative to the first sleeve as permitted by said lost motion connecting means.

5. A separable connector according to claim 4 wherein the lost motion connecting means comprises resilient means yieldable throughout a predetermined range which constantly urges the second sleeve angularly toward its locking position.

6. A separable connector according to claim 5, wherein the lost motion connecting means comprises stop shoulder means on the first and second sleeves, said stop shoulder means engaging each other to provide a positive drive between the second and first sleeves before the end of the range of yielding of the resilient means is reached.

7. A separable connector comprising first and second connector bodies adapted to be secured together in aligned operative relationship, means for securing the two bodies together comprising a first sleeve mounted on the first body for rotation with respect thereto while being held from axial movement therealong toward the second body, interfitting formations on said sleeve and the second body which pull the bodies together and maintain them in that position upon the turning of the sleeve in one direction relative to the second body, and releasable locking means for preventing the turning of said sleeve from the position thereof relative to the second body in which it secures the connector bodies together in operative relationship, said locking means comprising a second sleeve having at least a part thereof telescoped over the first sleeve, a rotary lost motion connection between the two sleeves whereby the first sleeve may be turned by the second sleeve, a shiftable detent carried by the first sleeve and simultaneously at least substantially engaging a radially outer wall portion of the first body and a radially inner wall portion of the second sleeve, and cooperating detent receiving formations on said outer and inner wall portions which lock the first sleeve against rotation with respect to the first body when the second sleeve lies in a first angular position about its axis with respect to the first sleeve and the first body and which free the first sleeve for rotation with respect to the first body upon the turning of the second sleeve to a second angular position with respect to the first sleeve and the first body.

8. A separable connector according to claim 7, wherein the first sleeve has a generally radially extending slot therethrough so that said wall portions of the first body and the second sleeve confront each other through said slot, and said detent is mounted within the slot in the first sleeve.

9. A separable connector according to claim 7, wherein said lost motion connection comprises resilient means for urging the second sleeve angularly toward said first angular position with respect to the first sleeve, said resilient means yielding to permit the second sleeve to be turned to said second angular position relative to the first sleeve.

10. A separable connector according to claim 7, wherein said lost motion connection comprises opposed springs acting between the first and second sleeves for urging the second sleeve toward said first angular position with respect to the first sleeve, the respective springs yielding in opposite directions when the second sleeve is turned in opposite directions from said first angular position relative to the first sleeve.

11. A coupling device comprising a cylindrical shell having at least one first recess in the outer wall thereof, a cylindrical coupling member mounted in a fixed axial position on said shell for rotation relative thereto, and means for releasably locking said member against rotation on the shell, said locking means comprising a detent movably mounted on said member and movable radially between an inner locking position operatively engaged in said first recess to prevent relative rotation of said shell and member and an outer releasing position removed from said first recess to permit relative rotation of said shell and member, and a sleeve mounted in a fixed axial position on said member for only a limited range of angular movement relative thereto, and resilient means for yieldably urging said sleeve angularly to a predetermined angular position relative to said member to hold said detent in locking position, said sleeve being angularly movable in opposition to said resilient means to free said detent for movement to its releasing position to thereby permit simultaneous rotation of said member and sleeve relative to said shell.

12. A separable connector comprising a coupling device as defined in claim 11 and further including a second cylindrical shell and cooperating means on said second shell and the coupling member for connecting the same in response to relative rotation thereof.

13. A coupling device as defined in claim 11 wherein there are a plurality of said first recesses angularly spaced about the periphery of said shell.

14. A coupling device as defined in claim 11 wherein said resilient means are housed between the outer and inner walls of said member and sleeve, respectively.

15. A coupling device as defined in claim 11 wherein said detent is a roller mounted in a radial opening through the wall of said member.

16. A coupling device as defined in claim 15 wherein said roller is a sphere.

17. A coupling device as defined in claim 11 wherein said predetermined angular position of the sleeve on the coupling member for holding the detent in locking position is intermediate the terminals of said limited range of angular movement of the sleeve on said member.

18. A coupling device as defined in claim 17 wherein said resilient means comprises opposed springs for resisting angular movement of said sleeve relative to said member in either direction from said predetermined position.